(12) United States Patent
Barker

(10) Patent No.: US 8,819,605 B1
(45) Date of Patent: Aug. 26, 2014

(54) DERIVING EFFECTIVE CORNERS FOR COMPLEX CORRELATIONS

(71) Applicant: Oracle International Corporation, Redwood City, CA (US)

(72) Inventor: Aaron J. Barker, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/786,927

(22) Filed: Mar. 6, 2013

(51) Int. Cl.
*G06F 17/50* (2006.01)
*G06F 9/455* (2006.01)
*G06F 11/22* (2006.01)

(52) U.S. Cl.
CPC ................... *G06F 17/5081* (2013.01)
USPC ........................................... 716/112; 716/136

(58) Field of Classification Search
CPC ............ G06F 17/5081; G06F 17/5068; G06F 17/5036; G06F 17/5022; G06F 17/5077
USPC .................................................. 716/112, 136
See application file for complete search history.

(56) References Cited

U.S. PATENT DOCUMENTS

| | | | | |
|---|---|---|---|---|
| 2003/0188280 A1* | 10/2003 | Lu | ...................................... | 716/6 |
| 2006/0150129 A1* | 7/2006 | Chiu et al. | ......................... | 716/4 |
| 2007/0136706 A1* | 6/2007 | Hwang et al. | ...................... | 716/6 |
| 2007/0136714 A1* | 6/2007 | Cohn et al. | ........................ | 716/13 |
| 2008/0066025 A1* | 3/2008 | Tanaka | ................ | 716/4 |
| 2009/0031268 A1* | 1/2009 | Miranda et al. | .................... | 716/6 |
| 2009/0070716 A1* | 3/2009 | Joshi et al. | .......................... | 716/2 |
| 2009/0193369 A1* | 7/2009 | Chan et al. | ......................... | 716/4 |
| 2012/0035892 A1* | 2/2012 | Lu | ..................................... | 703/2 |
| 2012/0259446 A1* | 10/2012 | McConaghy et al. | ......... | 700/104 |
| 2013/0018645 A1* | 1/2013 | Veers | ................ | 703/14 |
| 2013/0179851 A1* | 7/2013 | Le et al. | ......................... | 716/108 |
| 2013/0179852 A1* | 7/2013 | Foreman et al. | .............. | 716/113 |
| 2013/0226544 A1* | 8/2013 | Mcconaghy et al. | ............. | 703/2 |
| 2013/0238263 A1* | 9/2013 | Culp et al. | ....................... | 702/58 |

* cited by examiner

*Primary Examiner* — Thuan Do
*Assistant Examiner* — Magid Dimyan
(74) *Attorney, Agent, or Firm* — Marsh Fischmann & Breyfogle LLP; Daniel J. Sherwinter

(57) ABSTRACT

Systems and methods are described for simultaneously deriving an effective x-sigma corner for multiple, different circuit and/or process metrics for a semiconductor device. The result is an effective sigma that is representative of design intent. Some implementations account for covariance, and use joint probability as the criteria for the effective x-sigma corner (e.g., as opposed to a unique sigma level of each individual metric). Analysis results for each metric can be transformed to metric distributions in a common distribution framework, and a correlation matrix can be calculated. The transformed metric distributions can be input to a joint probability distribution set to achieve a target joint sigma level. The joint probability distribution and correlation matrix values can be used to back-calculate scaled x-sigma corners for each metric distribution. Simulation of the device can be performed at one or more of the scaled x-sigma corners.

20 Claims, 6 Drawing Sheets

US 8,819,605 B1

DERIVING EFFECTIVE CORNERS FOR COMPLEX CORRELATIONS

FIELD

Embodiments relate generally to semiconductor design, and, more particularly, to multi-dimensional yield analysis for manufacturing of semiconductor designs.

BACKGROUND

In deep submicron processes, the issue of achieving reasonable yield in light of manufacturing variability is a considerable challenge. At approximately the 130 nm process node, the underlying physics and quantum mechanical effects begin to govern the behavior of CMOS technology and the ability to dictate and predict the desired behavior begins to decline. In such technologies, for example, channel dopants are in concentrations on the order of fewer than 100 atoms with uncontrollable fluctuations from one device to another; line-width Cd-Variation becomes difficult or nearly impossible to control despite recent advances in lithography techniques; leakage becomes extreme; and electrons exhibit direct tunneling through dielectrics almost as if the dielectrics were not present. In addition to these limitations of solid state device physics, manufacturing technologists face other difficulties in fabricating circuit structures, such as ultra-deep ultra-violet lithography, optical phase correction (OPC), stepper control, phase shift masks (PSM), chemical mechanical polishing (CMP), depth of field correction (DOF), immersion lithography, etc.

These issues manifest uncertainty, variation, and great difficulty in controlling and managing manufacturing processes, which can result in tremendous yield loss. One traditional approach includes implementing Monte Carlo based simulation to model and predict yields, and then to make changes to improve yield. This approach can provide reasonable results for smaller circuits and small numbers of varying design metrics, but they may be unable to practically provide meaningful results in context of entire, typically larger and more complex, semiconductor devices having many associated design variables. Another traditional approach seeks to address these limitations by deriving "general-purpose" process corners at which to simulate a design-for-yield analysis and/or prediction. These general-purpose process corners are often non-physical and/or unrealistic, and may not explore sensitivities that can be critical to metrics of concern for a given circuit or circuit path.

Each circuit and each circuit metric may have its own sensitivities to process, temperature, voltage, signal and other environmental conditions. If these sensitivities all align, they can be systematically offset to improve yield. If not, achieving a reasonable yield can force appreciable trade-offs, which can become so severe as to produce a non-overlapping zero-yielding solution (e.g. when manufacturing engineers try to improve the yield by shifting the process, they can improve a Circuit A at the cost of hindering a Circuit B). For example, there may be a process condition at which a data path of a microprocessor will yield well, but a Level 2 Cache in the same microprocessor will not. As the process is offset or shifted to accommodate the Level 2 Cache yield, the data path yield may start to decline. Therefore, satisfying a wafer's parametric yield does not necessarily mean that all the circuits contained on the wafer will likewise have satisfactory yield. Typically, a product is considered well-yielding only when all probed parametric measurements and behavior characteristics simultaneously yield well.

BRIEF SUMMARY

Among other things, systems and methods are described for simultaneously deriving an effective x-sigma corner for multiple, different circuit and/or process metrics (e.g., or for a single, common metric across multiple, different sub-circuits). Embodiments operate in context of semiconductor device design (e.g., design of single transistors, circuits, chips, wafers, etc.), which can involve many circuit and process metrics. Manufacturing yield can manifest a different probability distribution for each metric (e.g., exponential, normal, log-normal, Weibull, etc.), and metrics may correlate to each other in different amounts. Embodiments adjust x-sigma corners for each metric to account for a joint probability distribution and/or covariance of the multiple metrics to achieve sigma levels that more closely represent intended design targets when simultaneously applied.

According to one set of embodiments, a method is provided. The method includes: identifying a target sigma level for a semiconductor device; determining a metric distribution corresponding to each of a number of metrics for the semiconductor device; transforming the metric distributions into respective input distributions having a common distribution type; calculating a correlation value for each input distribution; calculating a joint probability distribution as a function of the input distributions and their respective correlation values, such that the joint probability distribution has a joint probability corner at the target sigma level; calculating, for each input distribution, an output distribution manifesting an output metric corner scaled as a function of the joint probability distribution and the respective correlation value of the input distribution; and analyzing the semiconductor device, using a computer-implemented circuit analyzer, according to the output metric corners of the output distributions.

According to another set of embodiments, a system is provided. The system includes a processor and a non-transitory storage medium having processor-readable instructions stored thereon. The instructions, when executed, cause the processor to perform steps including: determining a metric distribution corresponding to each of a number of metrics for the semiconductor device; transforming the metric distributions into respective input distributions having a common distribution type; calculating a correlation value for each input distribution; calculating a joint probability distribution as a function of the input distributions and their respective correlation values, such that the joint probability distribution has a joint probability corner at the target sigma level; calculating, for each input distribution, an output distribution manifesting an output metric corner scaled as a function of the joint probability distribution and the respective correlation value of the input distribution.

BRIEF DESCRIPTION OF THE DRAWINGS

The present disclosure is described in conjunction with the appended figures.

Figure 1:
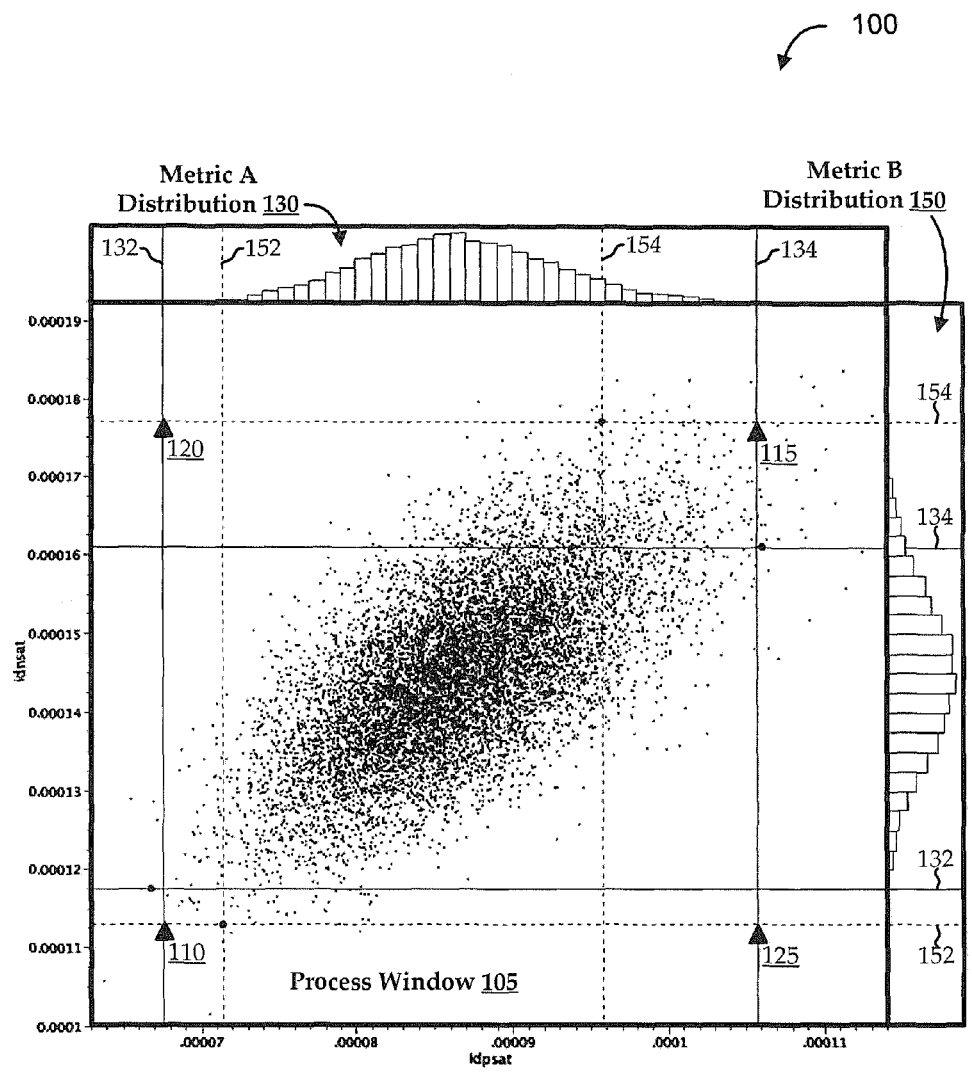
FIG. 1 shows plots that illustrate interactions between different metrics.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

It has become increasingly common for circuit design efforts to include process design. For example, newer circuit designs often push the limits of available process technologies. Even when existing manufacturing processes are used, the tolerances, complexities, and other features of those processes can impact design of the circuits being manufactured using those processes. Variations in these process parameters, circuit metrics, and/or other factors (generally referred to herein as "metrics") can each impact yield. Accordingly, achieving a desired effective yield for a full circuit product (e.g., a microprocessor having a number of sub-circuits) can involve modeling, analyzing, and designing in a manner that simultaneously accounts for multiple of those metrics.

For example, during the design of semiconductor devices (e.g., single transistors, circuits, chips, wafers, etc.), circuit simulations, like post-layout circuit simulations, may be performed using a net-list extracted from the design layout, and may provide an assessment of the circuit speed, the influence of circuit parasitics (such as parasitic capacitances and resistances), and any glitches that may occur due to signal delay mismatches. Any circuit sensitivities identified by during simulation may be corrected using an iterative approach until the simulations indicate that the device is likely to meet functionality and performance goals and to yield reasonably well. Once these simulations are complete (and any identified design rule errors are corrected), the design may be ready for fabrication and may be sent to a fabrication facility. Traditionally, process corners (e.g., typical, best-case, and worst-case process parameter combinations) have been chosen for circuit simulations based on simulations and/or yield data related to individual circuit parameters and/or process parameters.

According to many traditional techniques, simulations assess yield for each individual metric on each individual circuit. For example, x-sigma corners (also referred to herein as "process corners," "sigma levels," and the like) are derived only for individual process parameters, and often do not represent real-world worst-case conditions as they pertain to circuit metrics. While certain traditional techniques attempt to handle multiple metrics simultaneously (e.g., including modeling effects of process variations, determining parametric yield, and/or analyzing yield), those approaches do not tend to account for joint probabilities and/or correlations between metrics.

For example, U.S. Pat. No. 7,716,023 to Barker et al., which is incorporated by reference herein for all purposes, describes techniques for deriving highly significant corners by simulating the device using a surrogate model. These techniques can determine simultaneous yield of two or more metrics, and can derive the corners most likely to represent physically attainable simultaneous yield limits for larger circuits for use in full-scale simulation analysis. However, these techniques tend still to be limited in a number of ways. One such limitation is that it becomes difficult or impossible to meaningfully visualize a combined metric analysis for more than two or three simultaneous metrics. For example, it may be difficult or impossible to meaningfully visualize the metric distributions and corners in a thousand-dimensional space, or to use that information for effective design. Another such limitation is that each of the various types of metrics can manifest a different type of probability distribution, a different magnitude of impact on the effective yield, etc., which can limit the usefulness of combining those different metrics. For example, combining simulated yield data for multiple metrics simultaneously according to those traditional techniques can result in an effective sigma level that is higher than desired, particularly where the metrics are correlated. This incorrect sigma level can drive excessive design constraints, unintended (and often undesirable) design trade-offs, and other issues.

Turning to FIG. 1, three plots are shown to illustrate interactions between different metrics. A process window 105 is shown for PMOS and NMOS speed metrics of a given semiconductor device, including four process corners defined according to a large number of measured or simulated process points. The process corners are illustrated as "fast PMOS"/"slow NMOS" (illustrated as fast/slow corner 120), "fast PMOS"/"fast NMOS" (illustrated as fast/fast corner 115), "slow PMOS"/"slow NMOS" (illustrated as slow/slow corner 110), and "slow PMOS"/"fast NMOS" (illustrated as slow/fast corner 125). In this example, it is assumed that the NMOS and PMOS speed metrics are correlated to some extent (e.g., what makes the PMOS transistors fast also tends to make the NMOS transistors fast and what makes the PMOS transistors slow also tends to make the NMOS transistors slow). Accordingly, the process points tend to form an elliptical pattern, and choosing worst-case scenarios in which fast PMOS transistors are combined with slow NMOS transistors, or slow PMOS transistors are combined with fast NMOS transistors, may result in simulating the integrated circuit under unrealistic (e.g. non-physical) conditions. For example, if a +3 Sigma process point for fast NMOS devices (i.e., those having strong device characteristics), and a −3 Sigma process point for slow PMOS devices (i.e., those having weak drive characteristics), had the characteristics of this "Slow/Fast" corner 120 been physically possible, the probability of having both fast NMOS devices and slow PMOS devices on a single die may be 1 in 548,779. This probability is calculated by multiplying the Upper Tail Probability for a Normal distribution (UTPN) of the fast NMOS case by the Lower Tail Probability for a Normal distribution (LTPN) of the slow PMOS case, or [UTPN(3)*LTPN(−3)], as probabilities can be combined multiplicatively when independent and uncorrelated. In this case however these two devices are correlated and not in the direction of this Slow/Fast corner which makes the likelihood of this Slow/Fast corner all the more improbable. For example, the UTPN can be calculated as:

$$UTPN = \left[1 / \sqrt{2\pi * \text{Variance}}\right] \int_{Sigma\_Target}^{\infty} e^{(t-Mean)^2 / (2*Variance)} \, dt$$

FIG. 1 also shows a Metric A distribution 130 and a Metric B distribution 150 as respective illustrative histograms of the number of units (i.e., the height of each bar of the histogram) manifesting each value (or range of values) of two respective metrics across the process window. Metric A process corners 132 and 134 are derived from simulations and/or yield data corresponding to process points at which Metric A is out of specification for instances of a first device (i.e., considered non-functional or unacceptable with respect to Metric A). For example, Metric A process corners can be derived from the scatter plot data in the process window 105. Metric B is another circuit metric (e.g., or the same metric for a different device), and its Metric B process corners 152 and 154 are similarly derived from simulations and/or yield data corresponding to process points at which Metric B is out of specification (i.e., considered non-functional or unacceptable with respect to Metric B).

As illustrated, the Metric A distribution 130 reasonably aligns with the Metric A process corners 132 and 134, such that there are realistic physical possibilities that align with the upper and lower tails of the distribution. Also, the Metric B distribution 150 reasonably aligns with the Metric B process corners 152 and 154, such that there are realistic physical possibilities that align with the upper and lower tails of the distribution. However, when the Metric A process corners 132 and 134 are projected onto the Metric B distribution 150 (i.e., Metric B is evaluated in the corners derived for Metric A), or the Metric B process corners 152 and 154 are projected onto the Metric A distribution 130, the yields do not correspond to realistic conditions (i.e., the corners of one metric do not appear relevant to yield estimations for the other metric). For example, the delay of a ring oscillator with a fan-out of 1 may be highly sensitive to saturation current, while the delay of a ring oscillator with a fan-out of 4 may be more sensitive to gate capacitance than to saturation current. Different sensitivities to process, voltage, temperature, signal, etc. for different components (e.g., sub-circuits) can manifest as Metric A results not informing Metric B yields in useful ways. As illustrated, many data values for the Metric B distribution 150 fall well outside the Metric A process corners 132 and 134. This can indicate that if the yield were predicted based on the Metric A process corners 132 and 134, many instances of the second device would be considered out-of-spec (as falling outside Metric A process corners 132 and 134 as projected onto the Metric B distribution 150), even though their performance is well within specifications for Metric B.

Looking at process corners for individual metrics can misalign the design effort with target design parameters. Suppose a target sigma level for the product having both the PMOS and NMOS devices is three-sigma (i.e., the target functional manufacturing yield is three standard deviations from the mean, or approximately 99.73%). As a corollary, the target can be expressed as a maximum allowable non-functional yield. As illustrated in FIG. 1, it may be reasonable to design the PMOS device to a three-sigma level with respect to Metric A, and it may be reasonable to design the NMOS device to a three-sigma level with respect to Metric B. However, it may be impractical to design a circuit that simultaneously meets both criteria. This can be illustrated by all four process corners shown in the process window 105 falling outside the set of process points, which manifests that the effective sigma of the joint probability of both metrics being satisfied is actually greater than the intended three-sigma level (as described below). It is worth noting that FIG. 1 illustrates a bivariate condition (i.e., where two metrics are of concern), and the difficulties and limitations described can be appreciably exacerbated when more metrics are introduced. For example, it may be desirable to analyze a circuit having thousands of sub-circuits and thousands of metrics that can impact manufacturing yield.

For the sake of illustration, a system has Metric A and Metric B, which combine additively (such as is the case for delay of two logic gates which are in the same path), and each of Metric A and Metric B can first be considered as being uncorrelated (COV=0) and as having a normal distribution. As described above, using traditional techniques, designing for the three-sigma target sigma level would typically involve designing for a three-sigma corner for Metric A and a three-sigma corner for Metric B. However, as uncorrelated metrics, the "effective sigma" can be calculated according to a "Variance Sum Law I" as follows:

$$\text{system\_sigma} = \text{sqrt}(\text{sigma\_metric}A^2 + \text{sigma\_metric}B^2)$$

$$= \text{sqrt}(3^2 + 3) =$$

$$4.24264,$$

where "system_sigma" is the joint probability or effective sigma of the system. "sigma_metricA" is the x-sigma corner of Metric A ($3\sigma$), and "sigma_metricB" is the x-sigma corner of Metric B (also $3\sigma$). The resulting joint probability yields an effective sigma of 4.24264, which is appreciably larger than the desired target level of only three-sigma. The results with correlated metrics can be calculated according to a "Variance Sum Law II" as follows:

$$\text{system\_sigma} = \text{sqrt}(\text{sigma\_metric}1^2 + \text{sigma\_metric}2^2 + 2*\text{COV}*\text{sigma\_metric}1*\text{sigma\_metric}2 \ldots).$$

where COV is the correlation between the two metrics. For example, if the metrics are fully correlated (COV=1), the effective sigma can be calculated as:

$$\text{system\_sigma} = \text{sqrt}(\text{sigma\_metric}1^2 + \text{sigma\_metric}2^2 + 2*\text{COV}*\text{sigma\_metric}1*\text{sigma\_metric}2 \ldots)$$

$$= \text{sqrt}(3^2 + 3^2 + 2*1*3*3) = \text{sqrt}(9+9+18)$$

$$= 6,$$

or, effectively, twice the intended target sigma level of $3\sigma$.

Extending the examples from above, a semiconductor device includes a PMOS transistor and an NMOS transistor, each having a speed metric, and it is desired that the semiconductor device is designed to have a functional manufacturing yield of three sigma (i.e., so that approximately 99.73 percent of the manufactured devices will be functional). Using the illustrative traditional approach described above, 10,000 instances of the semiconductor device can be simulated at a three-sigma corner for either of the first or second transistor, yielding approximately 13 units (i.e. 10,000*[(1−99.73%)/2]) that exceeding the +three-sigma corner (otherwise referred to as the Upper Tail Probability (UTP), or UTPN for a normal distribution). Any of those 13 device instances that is likely to occur could be used for redesign, so that the next design iteration would hopefully satisfy the metric. Accounting for both metrics simultaneously, however, the illustrative traditional approach essentially attempts to identify the small number of device iterations that failed to meet both path delay metrics (e.g., by finding any overlapping instances between the 13 instances that did not meet the first metric and the 13 instances that did not meet the second metric). According to First Variance Sum Law stated above, even if the metrics are uncorrelated, satisfying both metrics simultaneously involves reaching a sigma level of approximately 4.24. At that sigma level, designers are trying to meet a functional yield of over 99.99 percent (so that fewer than one in every 10,000 units is out-of-spec), even though the intended yield target is only three-sigma.

Embodiments use the joint probability to reach the intended sigma level, and back-calculate appropriate x-sigma corners for each metric according to the joint probability. Returning to the previous example, the desired sigma level is three-sigma. Rather than using three-sigma for each metric, a three-sigma level is applied to a joint probability distribution for the two metrics (e.g., a joint sigma level of three-sigma is sought). For the illustrated bivariate case, assuming both metrics are scaled equally, the First Variance Sum Law can be used to solve for appropriate individual metric process corners. For example, the sigma levels for each metric can be calculated as 3*sqrt(2)/2, which equals approximately 2.12132. Using this value for the x-sigma corners, the effective sigma can be calculated as:

system_sigma=sqrt[(3*sqrt(2)/2)+(3*sqrt(2)/2)²]

=sqrt(18/4+18/4)

=3

This verifies that the effective sigma manifests the desired three-sigma corner for the joint probability.

It is noted that, in the first case (where each metric is designed to a three-sigma corner), the designers will actually be designing the product to meet a 4.24-sigma corner, which may be appreciably more difficult than meeting the intended three-sigma corner. Meeting that higher corner may involve using additional design hours and/or making additional design trade-offs to effectively over-design the product for a higher-than-intended yield. Using the second approach (where each metric is designed to a 2.12-sigma corner), the individual sigma levels are relaxed to achieve an effective sigma that is representative of the design intention.

Embodiments simultaneously derive an effective x-sigma corner for multiple, different circuit metrics or for a single, common metric across multiple, different sub-circuits. The result is an effective sigma that is representative of design intent. For example, implementations account for covariance, and use joint probability as the criteria for the effective sigma level (e.g., as opposed to a unique sigma level of each individual metric). Analysis results for each metric can be characterized as a Weibull distribution and transformed to a normal (i.e., Gaussian) distribution. A correlation matrix can be calculated with correlation values for each metric's Gaussian distribution, and the Gaussian distributions can be input to a multivariate normal distribution function. The multivariate normal distribution function can be generated to achieve a desired effective x-sigma corner (e.g., 3σ). The correlation matrix values can be used to back-calculate an x-sigma corner for each metric distribution as a function of the multivariate normal distribution and its respective correlation value. For example, Metric1>2.4σ; Metric2>2.4σ; Metric3>1.8σ; . . . MetricN>2.3σ; jointly yielding an effective sigma level of 3σ. In some embodiments, the resulting metric x-sigma corners are passed as inputs to a surrogate model, for example, for full-scale simulation analysis.

Figure 2:
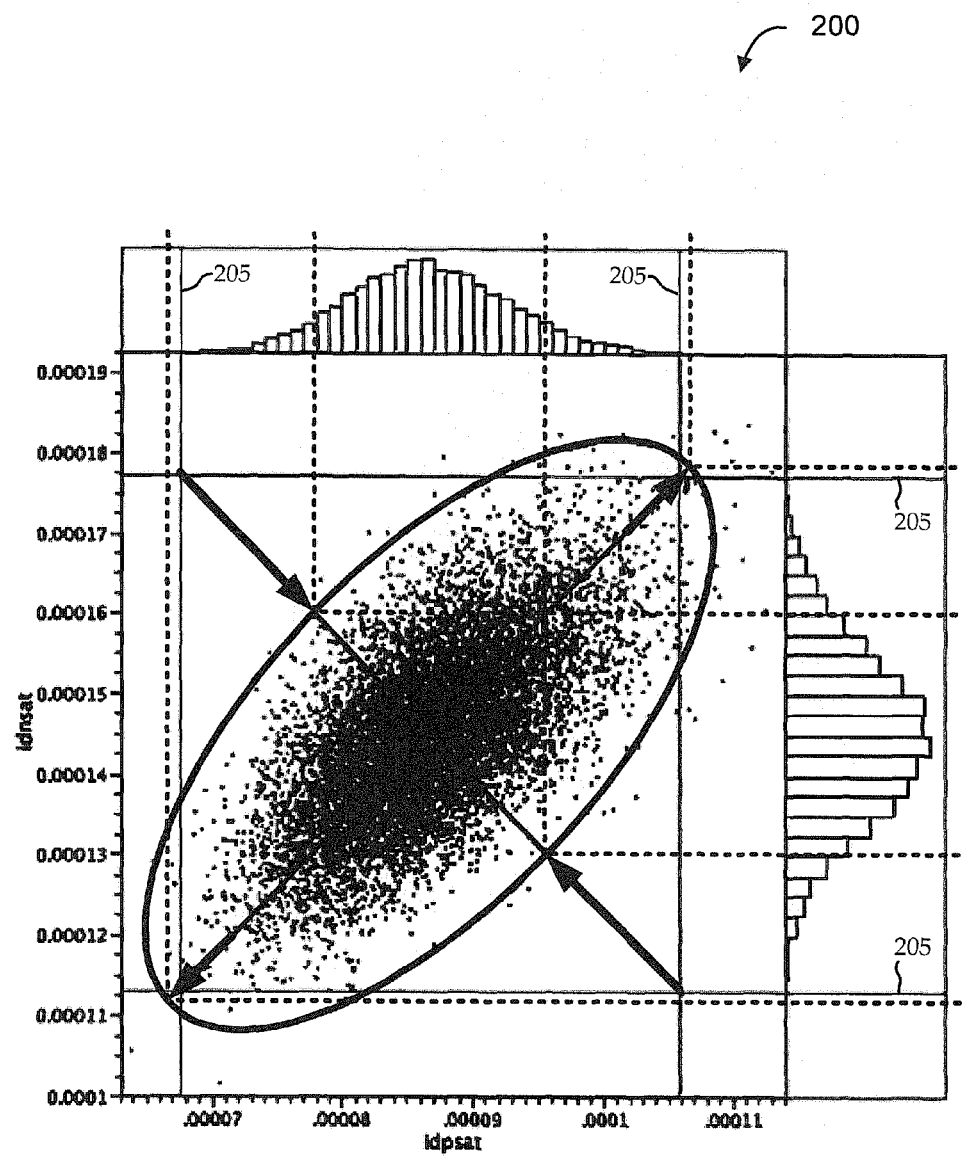
FIG. 2 shows plots that illustrate an approach to using a joint probability distribution to determine sigma levels for individual metrics.

FIG. 2 shows plots that illustrate an approach to using a joint probability distribution to determine sigma levels for individual metrics, according to various embodiments. An illustrative process window is shown with a large number of measured or simulated process points for two circuit metrics (e.g., saturation current of an NMOS device on the Y-axis and saturation current of a PMOS device on the X-axis) with corresponding histograms. Guides 205 are illustrated at the +3σ and −3σ process corners for each metric.

For the sake of illustration, it is assumed that a target sigma level for the semiconductor device having both the NMOS and PMOS devices is three sigma. Said differently, a target joint probability level for simultaneously satisfying both metrics (e.g., or any number of metrics in other scenarios) is approximately 99.7 percent. A metric distribution for each metric has been generated (e.g., by simulation of a large number of instances of the semiconductor device), as shown in the process window and the histograms, and the distributions have been transformed into non-negative normal distributions as described below. Though not explicitly shown, a correlation has been calculated for the two metrics.

A multivariate probability ellipse can be derived to equates to the target sigma level. While terms like "ellipse" and "area" imply two dimensions, and the illustrated embodiments show only two dimensions for the sake of clarity, any number of dimensions is possible. For example, as used herein, an "ellipse" can actually be an ellipsoid having a hypervolume, a two-dimensional cross-sectional slice through an ellipsoid having an area, etc. Further, while descriptions refer to "sigma levels," "probability corners," etc., these terms are intended generally to refer to their n-dimensional counterparts where appropriate. For example, a probability corner in context of a multidimensional ellipse can actually be a point in n-dimensional hyperspace representing a joint probability level.

The ellipse includes a semi-major axis and a semi-minor axis. The semi-major axis tends to align with a correlation direction (an "axis of correlation"), and a semi-major radius intersects the positively correlated process corners. The ratio between the semi-major and semi-minor axes is a function of the correlation between the metrics, and the area of the ellipse (or hypervolume, etc.) is the target joint probability (corresponding to the target sigma level). In the case of non-correlated metrics, the ellipse is a circle. In the illustrated case, process conditions that tend to increase saturation current of an NMOS device also tend to increase saturation current of the PMOS device, so that high-high and low-low joint process corners define the correlation axis direction. The multivariate probability ellipse can be derived by specifying the joint probability level for the multivariate normal distribution (i.e., the area of the ellipse) and solving for the points along the axis of correlation and orthogonal to this axis of correlation (i.e., the vertices of the ellipse).

In the illustrated scenario, the probability ellipse shows the high-high and low-low joint process corners pushed out slightly from their original locations, as defined by the individual metric corners. The probability ellipse also shows the high-low and low-high joint process corners pushed in appreciably from their original three-sigma locations. This indicates that, in this scenario, meeting the target joint probability level for the two metrics simultaneously involves slightly increasing the sigma levels for the high-high and low-low joint process corners to avoid under-design, but allowing appreciable relaxation of the sigma levels for the high-low and low-high joint process corners to avoid over-design (as illustrated by the dashed guides). The ellipse can be used to derive respective sigma levels for the individual metrics.

Figure 3:
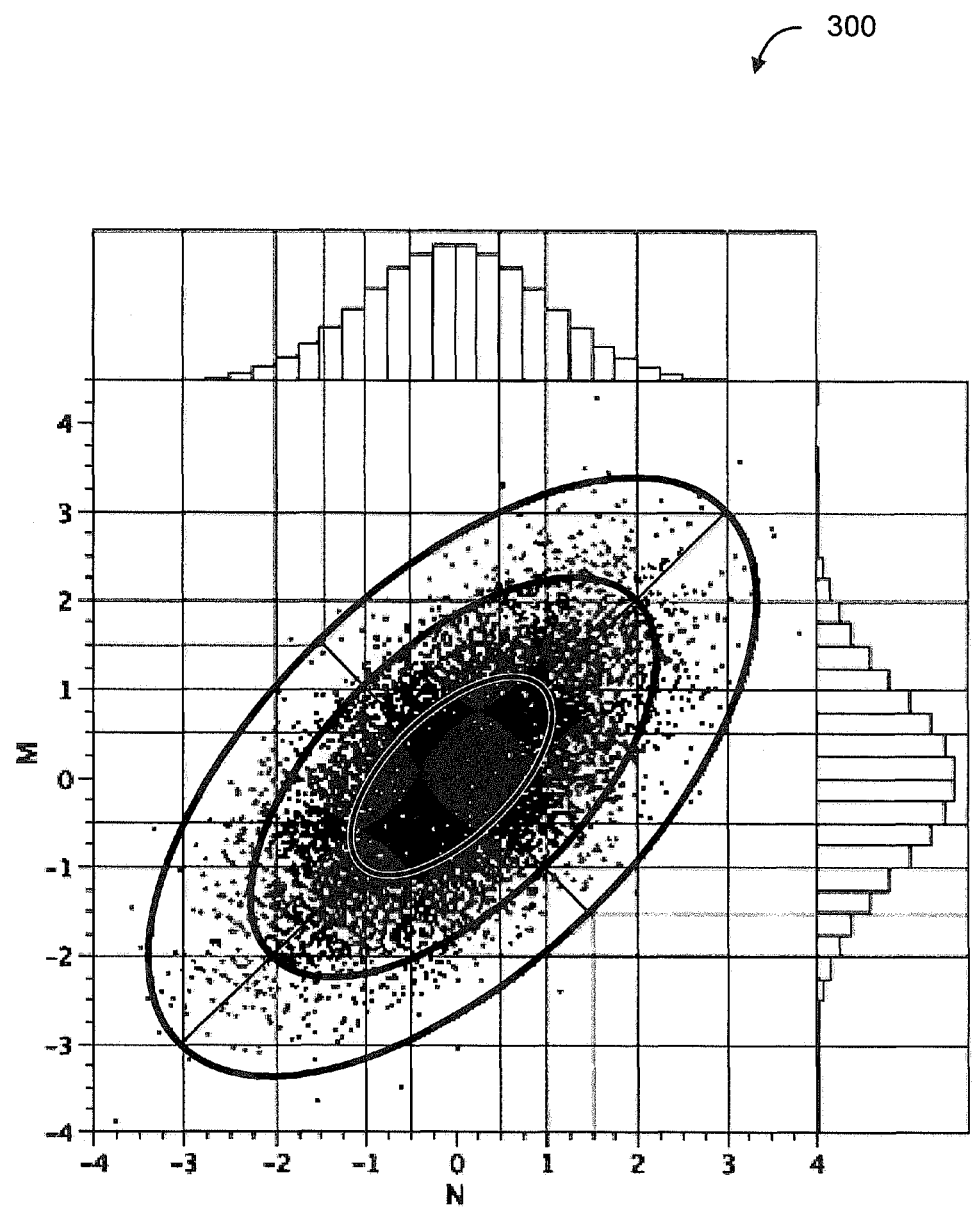
FIG. 3 shows plots that illustrate another approach to using a joint probability distribution to determine sigma levels for individual metrics.

FIG. 3 shows plots that illustrate another approach to using a joint probability distribution to determine sigma levels for individual metrics, according to various embodiments. The scenario illustrated in FIG. 3 can be used, for example, when a target joint probability level (e.g., a target sigma level) is not known. As in FIG. 2, an illustrative process window is shown with a large number of measured or simulated process points for two circuit metrics with corresponding histograms.

It is assumed that upper specification limits and lower specification limits have been calculated or determined, and a correlation matrix has been calculated with correlation values for each metric. Intersecting locations for these metric specification limits can be determined. Taking any of these intersection locations, an ellipse representing an equiprobability space can be derived, and points can be calculated along the semi-major and semi-minor axes of the ellipse (i.e., representing the correlation axis and the axis orthogonal to correlation, respectively, as described above). For example, the four points where the axes cross the ellipse determine the vertices of the ellipse (i.e., points where the curvature of the ellipse is minimized or maximized).

The derived equiprobability ellipse can be used in a number of ways. One use for the ellipse is that the area of the ellipse (or its volume or hypervolume in n-dimensions) can represent the joint probability level. Another use for the ellipse is that the vertices of the ellipse can be used to derive the respective sigma levels of the individual metrics. Yet another use for the ellipse is to determine whether the design is being constrained in unnatural ways. For example, when the intersecting location of the specification limits does not line up with the axis of correlation, this can indicate that the process or device is being constrained unnaturally. For the sake of illustration, three ellipses are shown to represent one-, two-, and three-sigma process corners, respectively.

Figure 4:
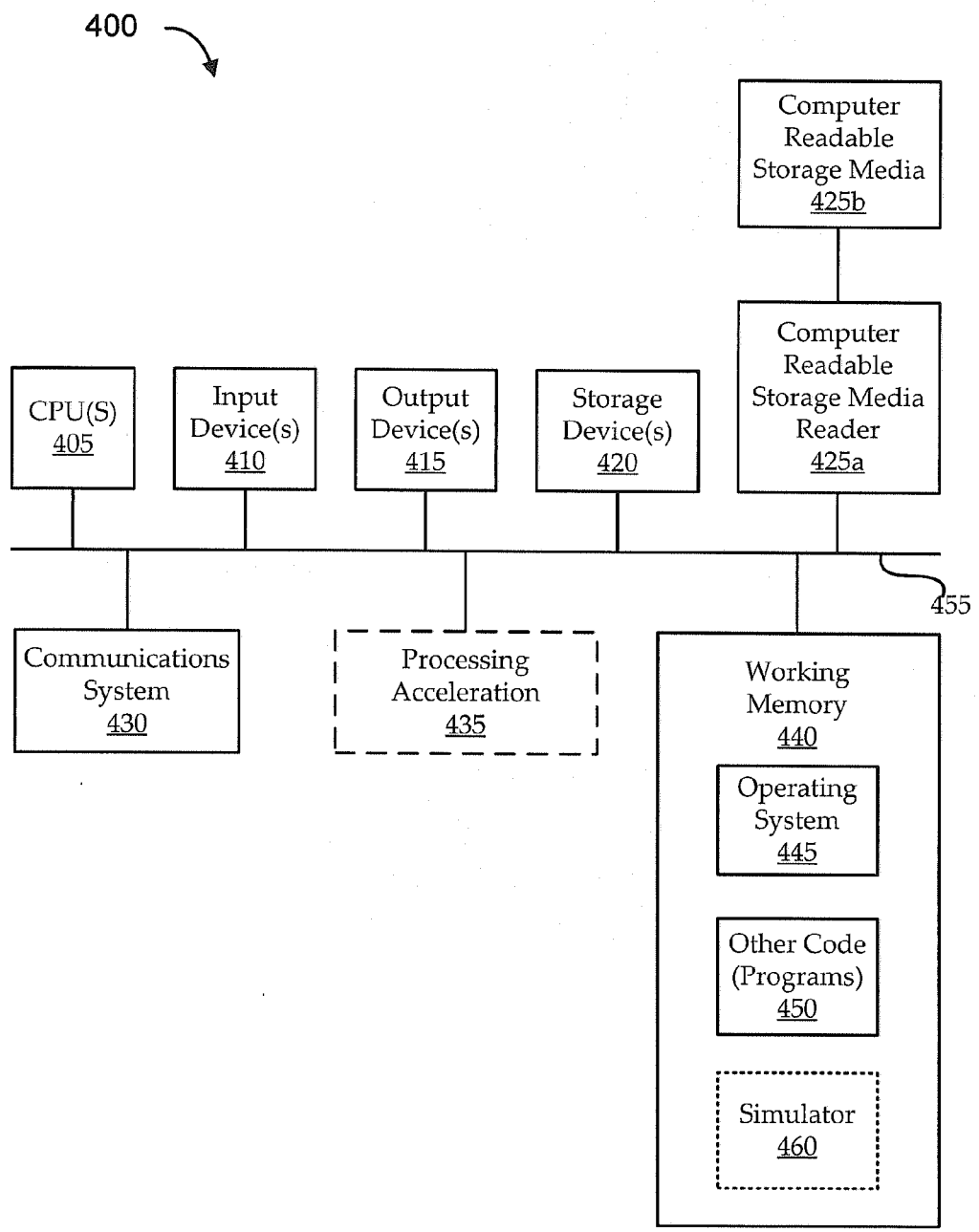
FIG. 4 shows an illustrative computational system for implementing functionality of various embodiments.

FIG. 4 shows an illustrative computational system 400 for implementing functionality of various embodiments. The computational system 400 can include or perform design, analysis, simulation, and/or other functionality of embodiments described herein. For the sake of simplicity, the computational system 400 is shown including hardware elements that can be electrically coupled via a bus 455. However, embodiments of the computational system 400 can be implemented as or embodied in single or distributed computer systems, in one or more locations, or in any other useful way.

The hardware elements can include one or more central processing units (CPUs) 405, one or more input devices 410 (e.g., a mouse, a keyboard, etc.), and one or more output devices 415 (e.g., a display device, a printer, etc.). The computational system 400 can also include one or more storage devices 420. By way of example, storage device(s) 420 can be disk drives, optical storage devices, solid-state storage device such as a random access memory (RAM) and/or a read-only memory (ROM), which can be programmable, flash-updateable and/or the like. Embodiments of the storage devices 420 can be used to store final outputs or intermediate data generated by systems and methods described herein, including, but not limited to, simulation data, measured device parameters and circuit metrics values, candidate corner hash tables or lists, etc.

The computational system 400 can additionally include a computer-readable storage media reader 425a, a communications system 430 (e.g., a modem, a network card (wireless or wired), an infra-red communication device, etc.), and working memory 440, which can include RAM and ROM devices as described above. In some embodiments, the computational system 400 can also include a processing acceleration unit 435, which can include a DSP, a special-purpose processor and/or the like.

The computer-readable storage media reader 425a can further be connected to a computer-readable storage medium 425b, together (and, optionally, in combination with storage device(s) 420) comprehensively representing remote, local, fixed, and/or removable storage devices plus storage media for temporarily and/or more permanently containing computer-readable information. In some embodiments, the home CDN 125 is implemented, in whole or in part, as computer-readable storage media 425b. The communications system 430 can permit data to be exchanged with a network and/or any other computer described above with respect to the computational system 400.

The computational system 400 can also include software elements, shown as being currently located within a working memory 440, including an operating system 445 and/or other code 450, such as an application program (which can be a client application, web browser, mid-tier application, relational database management system (RDBMS), etc.). In some embodiments, one or more functions of a computer implemented circuit simulator 460 are implemented as application code 450 in working memory 440.

Alternate embodiments of the computational system 400 can have numerous variations from that described above without departing from the scope of embodiments. For example, customized hardware might also be used and/or particular elements might be implemented in hardware, software (including portable software, such as applets), or both. Further, connection to other computing devices such as network input/output devices can be employed. In various embodiments of computational systems, like the one illustrated in FIG. 4, are used to implement one or more methods, such as those described below.

Figure 5:
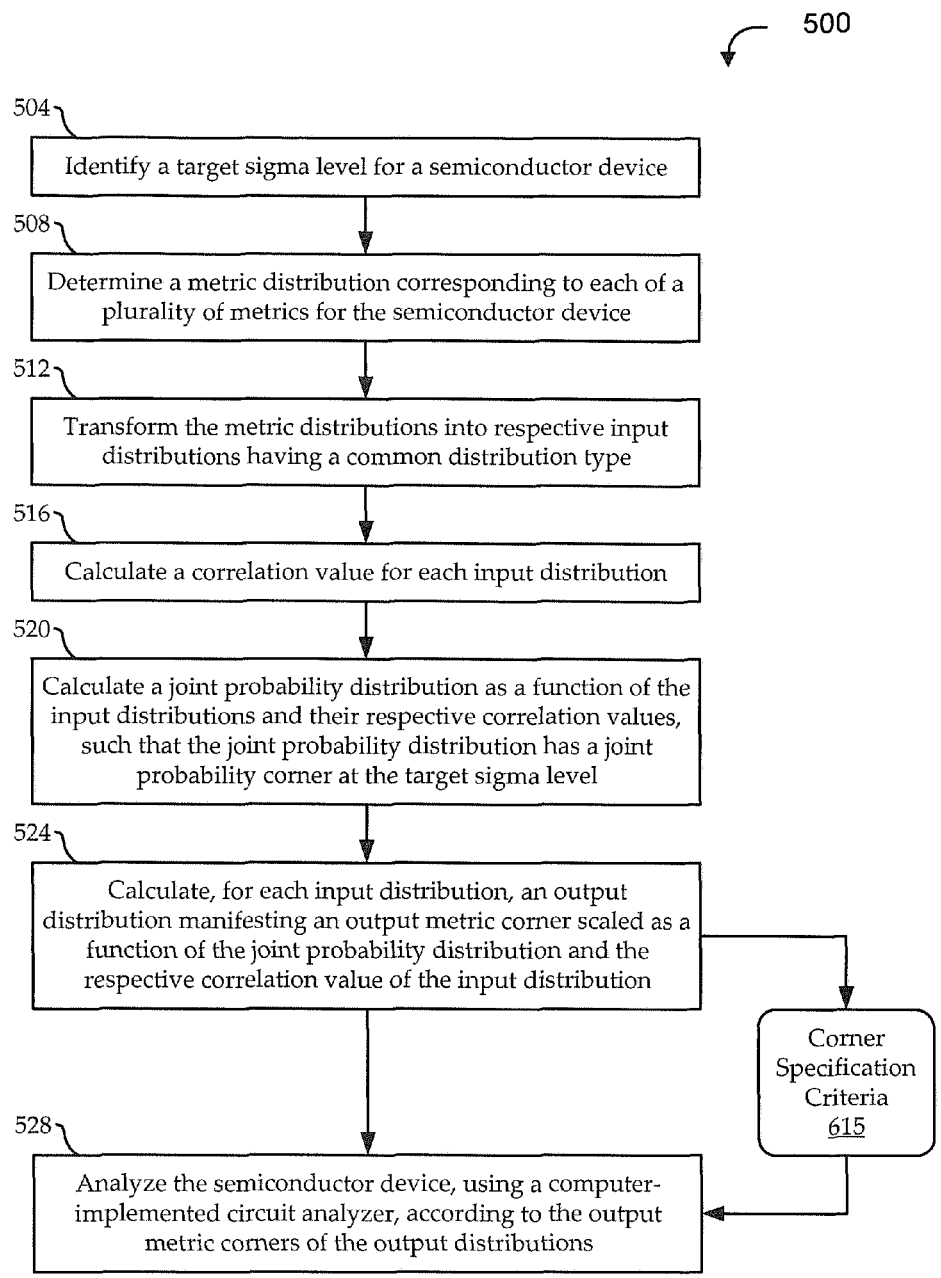
FIG. 5 shows a flow diagram of an illustrative method for generating metric corners according to a joint sigma level of a joint probability distribution, according to various embodiments.

Turning to FIG. 5, a flow diagram is shown of an illustrative method 500 for generating metric corners according to a joint sigma level of a joint probability distribution, according to various embodiments. Embodiments of the method 500 begin at stage 504, by identifying a target sigma level for a semiconductor device. As used herein, the "semiconductor device" is intended to include any type of device or collection of devices, for example, a transistor, circuit, sub-circuit, chip, wafer, etc. The target sigma level can be defined in any suitable manner, for example, in x-sigma terms (e.g., three-sigma), as a desired minimum functional manufacturing yield, as a desired maximum non-functional manufacturing yield, etc. The target sigma level can be designated as a high-level design constraint for the product.

At stage 508, a metric distribution corresponding to each of a plurality of metrics for the semiconductor device is determined. Each metric may be a circuit metric, a process metric, a performance parameter, etc. (e.g., physical characteristics, like channel length and width for typical transistors, oxide thickness, and dopant concentrations; behavioral characteristics, like saturation currents, mobility, resistance/capacitance/inductance values for various parasitic and interconnect structures, and threshold voltages; device parameters, like temperature, voltage, environment, signals, and system parameters; etc.). Any number of metrics for any number of components can be defined. In one implementation, critical device parameters are identified and a variance of each critical device parameter is statistically described. For example, the critical dimensions for any critical device parameters can take on the canonical form:

$$CD = CD\_nominal + CD\_stdDev * CD\_sigma$$

The equations describing the variance of each device parameter may in some embodiments be more complex than in the examples above (depending on the physics that govern the variability, causality, and correlation of various factors), but in other embodiments, the canonical form may be adequate. A computer-implemented simulator (e.g., SPICE) may in some embodiments be configured to handle at least some of the complexities of the physics governing the system.

The nominal values and standard deviations of the values for each device parameters may be derived in any suitable manner, for example, according to specification limits. In some embodiments, upper specification limit (USL) values and lower specification limit (LSL) values may be set at +/−three-sigma (or some other level) to adhere to a process capability (Cpk) of 1, as defined below:

$$Cp = (USL - LSL)/6\sigma$$

$$Cpk = \min[(USL - \mu)/3\sigma, (\mu - LSL)/3\sigma]$$

The distribution of the device parameters (and/or any other type of metrics) can be determined in different ways. In one implementation, a Monte Carlo analysis is performed on the system, sweeping "seeds" of the critical dimensions using a Gaussian distribution centered about zero with a standard deviation of one. In some embodiments, in order to obtain a cleaner model, the seeds may be exacerbated using a uniform distribution of their values out to 6-sigma or beyond. For example, in one embodiment, Latin Hypercube sampling may be used as the Monte Carlo method in order to achieve good dispersion and unique sampling in the seeds. These and/or other types of simulations can provide corresponding measurements and distributions for the metrics of interest.

Depending on the type of metric and the associated data, the resulting distribution may follow a normal (Gaussian), log-normal, exponential, Weibull, or some other type. At stage 512, the metric distributions are transformed into respective input distributions having a common distribution type. In some implementations, the metric distribution is characterized as a Weibull distribution. The Weibull distributions are then transformed to Gaussian distributions. For example, appropriate Alpha (scale) and Beta (shape) values are obtained as Weibull characteristic parameters (e.g., using dedicated software functions, linear regression, etc.). The following can then be applied to transform the Weibull distribution into a Gaussian distribution:

$$y = 1 * \left[\left(\frac{x}{\alpha}\right)^\beta\right]^{1/3.4},$$

where '1' is the scale Alpha in the transform, and '3.4' is the scale Beta (e.g., the literature suggests that Beta of approximately 2.6-3.7 or 3.3-3.5 approximates Gaussian). In some embodiments, negative values are eliminated using offsets or other techniques. For example, if the pre-transform dataset includes negative values, the range of values can be offset by adding slightly more than the magnitude of the lowest negative value to each data point prior to performing the transform. In this way, the transform is to a non-negative (i.e. and non-zero) distribution.

At stage 516, a correlation value is calculated for each input distribution. For example, a correlation matrix is generated for the set of post-transform, Normal probability distribution functions, and the correlation matrix has correlation values for each normal input distribution. At stage 520, a joint probability distribution is calculated as a function of the input distributions and their respective correlation values, such that the joint probability distribution has a joint probability corner at the target sigma level. In some implementations, a multivariate distribution function is generated with the set of input distribution functions as inputs. At stage 524, the multivariate distribution (or joint probability distribution) can be used to calculate, for each input distribution, an output distribution manifesting an output metric corner scaled as a function of the joint probability distribution and the respective correlation value of the input distribution.

For example, a multivariate normal distribution is used with input normal distributions to calculate a joint probability of the multiple metrics occurring simultaneously. The input distributions are used as operands of the multivariate distribution, the multivariate distribution function is set equal to the target sigma level (e.g., three sigma), and the variables of the multivariate distribution become the respective x-sigma corner values of each input distribution. The x-sigma corner values of the input distributions can be solved as a function of the multivariate distribution function and the correlation matrix. In effect, the individual metric distributions are scaled by the multivariate distribution (the "joint corner" or "joint sigma level") so that the joint probability of all the metrics occurring becomes the target sigma level. Accordingly, the output metric corners typically express a lower sigma level than that of its corresponding input distribution. For example, each input distribution manifests an upper tail probability that is lower than or equal to an upper tail probability of its respective output distribution, so that the joint probability approach tends to relax the individual metric sigma levels.

At stage 528, the semiconductor device can be analyzed, using a computer-implemented circuit analyzer, according to the output metric corners of the output distributions. In some implementations, the analysis involves estimating a function or non-functional manufacturing yield of the semiconductor device by simulating the semiconductor device at one or more of the output metric corners. The analysis can also include identifying at least one device sensitivity for which a non-functional yield of the semiconductor device with respect to at least one of the plurality of metrics is estimated to exceed the respective output metric corner for the at least one of the plurality of metrics. For example, the analysis can identify a semiconductor device instance that manifests a path delay in excess of a predefined maximum allowable path delay. In some embodiments, in response to identifying the at least one device sensitivity, at least a portion of the semiconductor device is redesigned (e.g., iteratively) and re-analyzed the semiconductor device until the metric can be satisfied (e.g., until a predetermined functional yield with respect to the at least one of the plurality of metrics is satisfied). For example, a data path manifesting out-of-spec path delay is redesigned until simulation at the output metric corner reveals the desired yield. In some implementations, the set of output metric corners can be expressed at output corner specifications 615 that are passed to a surrogate simulation model, as described below.

Figure 6:
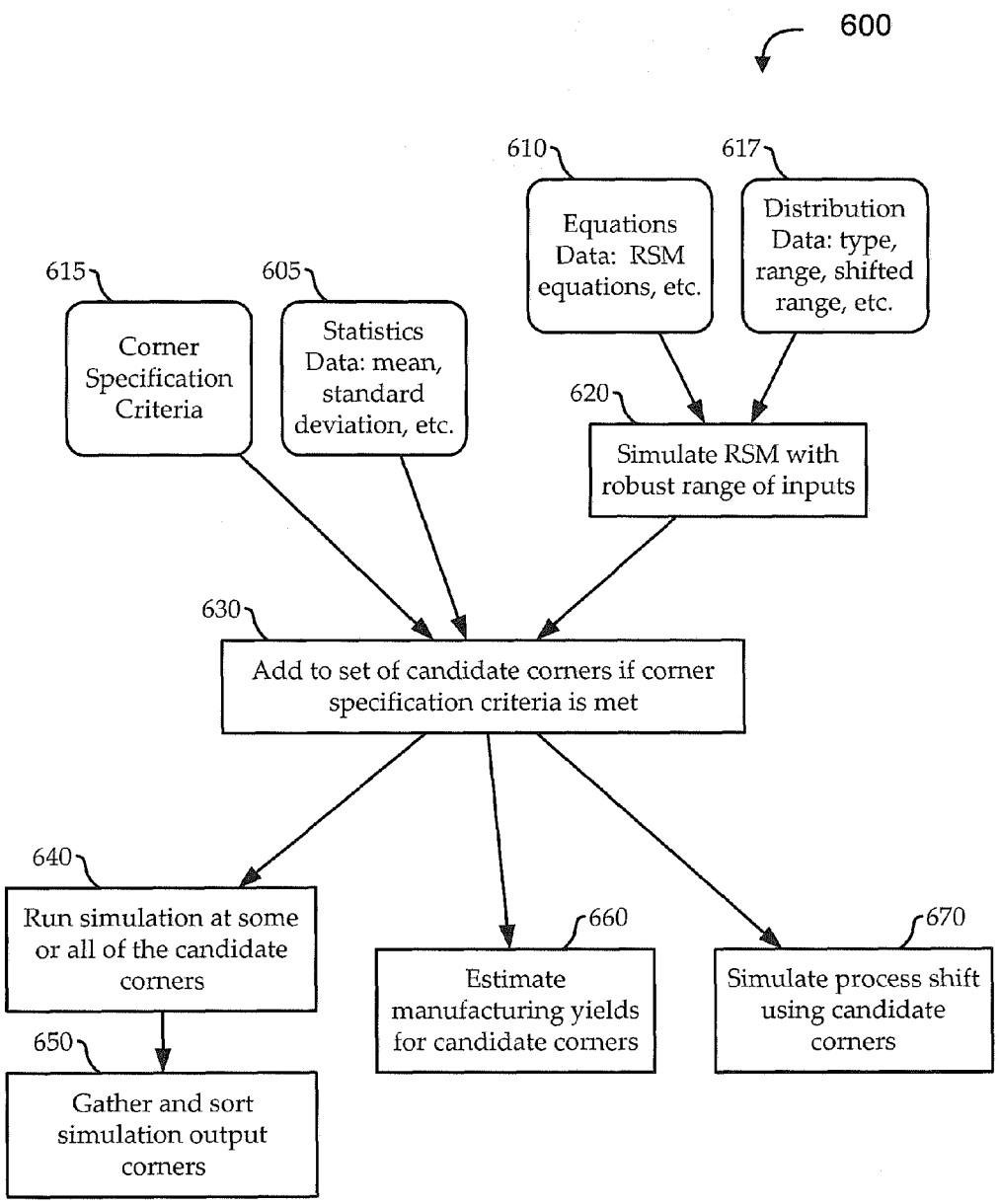
FIG. 6 shows a flow diagram of an illustrative method for finding candidate process corners in a multivariate surrogate simulation model, according to various embodiments.

FIG. 6 shows a flow diagram of an illustrative method 600 for finding candidate process corners in a multivariate surrogate simulation model, according to various embodiments. Various implementations use different types of inputs as candidate corners for use in the method 600. Some implementations use the output metric corner specifications 615 generated by the method 500 of FIG. 5 as specifications to determine which candidate corners meet desired target criteria. Other implementations include statistical inputs 605. For example, statistical data (e.g., mean, standard deviation, and other statistical measures) can be calculated from actual simulations or otherwise obtained from simulator output data.

According to some implementations, candidate corners are generated by evaluating a Response Surface Model (RSM) in a numerical solver (e.g., an optimizer), or by observation (e.g., via surrogate simulation). Inputs to the RSM can include equations data 610, like RSM equations, and/or distribution data 617 for various metrics (e.g., distribution shape and/or type, range, shift in range, etc.). For the sake of illustration, various metrics can be modeled and simulated according, for example, to critical device parameters and associated variances. The simulator output data and/or other data, like probe or other measurement data from manufactured devices, can be used to generate RSM equations. An initial RSM model can be formulated (e.g., using simple polynomial expansion), and the model can be fit to the designed system (e.g. by determining coefficients for the model that correspond to characteristics of the semiconductor device).

In one implementation, a goodness fit table is generated that includes a summary of the goodness of fit in terms of Pr>|t|. If a predetermined desired fit tolerance is satisfied, the generated equations are passed as the equations data 610 to the method 600. Otherwise, terms can be added and/or removed (e.g., terms having Pr>|t| values much greater than 0, indicating high degrees of error), and/or additional non-linear terms (e.g. ln(x), 1/sqrt(x), etc.) can be added to fitting terms, until the predetermined desired fit tolerance is satisfied by the RSM model. The RSM model can simulate the system and its various metrics over a robust range of inputs at stage 620 to determine candidate corners (e.g., in addition to the candidate corners generated by the method 500 of FIG. 5). Robustness of the range can be evaluated in various manners, for example, by determining that each seed in the sequence is unique so as to add value to the simulation. Simulating according to the RSM equations can permit large numbers of iterations to be simulated with reasonable resources (e.g., reasonable amount of execution time, memory, system cost, component cost, etc.).

Each of the generated candidate corners can be added to a candidate corner hash if corner specification criteria (e.g., criteria 615) is met at stage 630. For example, the candidate corner hash table can be used to store an index number (e.g. sample number) and values for particular device parameters corresponding to particular iterations. In other embodiments, candidate corner information (e.g., index and device parameter values) can be stored in a different type of data structure or output directly to other stages of the method 600. It is noted that, by using the candidate corner criteria generated with joint probability distribution techniques (e.g., as in FIG. 5), the stored candidate corners can account a priori for desired system sigma levels and correlations.

Having identified initial candidate corners in stage 630, a simulation application can be compiled and executed at some or all of the candidate corners at stage 640. In some embodiments, compiled binaries of the simulation application are dispatched to several machines of a distributed computing environment or to several processors of a multi-processor machine for parallel execution. Some implementations use simplified arithmetic models to emulate a complex system, thus allowing an analyst to perform fast simulations that represent more detailed and relatively slower traditional simulations. Using surrogate simulation, the number of Monte Carlo iterations may in some embodiments be increased on the order of at least 100-10,000 times an original data set size. In some embodiments, the recommended sample size may be based on the binomial confidence interval for the desired level of precision. The reason behind this is two-fold: to predict yield; and to produce enough candidate corners that a suitable corner may be identified. This method may particularly useful when selecting multiple criteria. For example, it may take a large number of samples to obtain a reasonably sized region of overlap when assessing simultaneous yield (i.e., it may take many samples to identify process corner limits at which the probability is high that multiple metrics will be within their given upper and lower specification limits, depending on the correlations of the metrics).

In some implementations, as the simulations complete, output data corresponding to the simulated candidate process corners can be gathered and sorted at stage 650. For example, a root sum square (RSS) approach is used for sorting the candidate process corners output from the simulations (e.g., like the Variance Sum Laws I and II described above). This formulated a multidimensional hyperspace in which candidate corners closest to a particular location in the hyperspace can be determined as those candidate corners having the "least root sum square" values. Those least-RSS-value candidate corners can correspond to the combination of out-of-specification device parameters that are most likely to occur. For example, identifying those corners may correspond to minimizing variance of the system, or representing most likely deviations to produce out-of-specification conditions defined by the candidate corners. As such, the least-RSS-value candidate corners can effectively delineate a process window region of interest. In some implementations, the RSS calculations are checked against theoretical sigma values, for example, to find and/or to verify combinations of process corners that satisfy theoretical targets. For example, the candidate corners can help identify which simulated out-of-spec device instances are likely to occur and should drive redesign efforts.

Various embodiments use the candidate corners in different ways. In some embodiments, some or all of the candidate corners are used to estimate manufacturing yields at stage 660. For example, the candidate corners can be used to estimate a number of parts per million out-of-spec (or in-spec) conditions produced by surrogate simulations. In other embodiments, at stage 670, some or all of the candidate corners are used to determine which metrics increase or decrease yield by comparing surrogate simulation results to various statistics.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g. Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method comprising:
    identifying a target sigma level for a semiconductor device;
    determining a metric distribution corresponding to each of a plurality of metrics for the semiconductor device;
    transforming the metric distributions into respective input distributions having a common distribution type;
    calculating a correlation value for each input distribution;
    calculating a joint probability distribution as a function of the input distributions and their respective correlation values, such that the joint probability distribution has a joint probability corner at the target sigma level;
    calculating, for each input distribution, an output distribution manifesting an output metric corner scaled as a function of the joint probability distribution and the respective correlation value of the input distribution; and
    analyzing the semiconductor device, using a computer-implemented circuit analyzer, according to the output metric corners of the output distributions.

2. The method of claim 1, wherein the target sigma level indicates a joint probability of non-functional yield for the semiconductor device.

3. The method of claim 1, wherein transforming the metric distributions into respective input distributions having a common distribution type comprises:
    characterizing each metric distribution as a non-negative Weibull distribution; and
    transforming each metric distribution from its respective non-negative Weibull distribution to a Gaussian distribution as the common distribution type.

4. The method of claim 3, wherein the joint distribution is a multivariate normal distribution.

5. The method of claim 3, wherein characterizing each metric distribution as a non-negative Weibull distribution comprises:
    characterizing each metric distribution as a Weibull distribution;
    determining whether any portion of the Weibull distribution is negative; and
    shifting the Weibull distribution so that all portions of the Weibull distribution are non-negative.

6. The method of claim 1, wherein calculating the joint probability distribution comprises deriving a multivariate probability ellipse that equates to the target sigma level.

7. The method of claim 1, wherein each metric relates to at least one of a device parameter, a process parameter, or a performance measure.

8. The method of claim 1, wherein analyzing the semiconductor device according to the output metric corners of the output distributions comprises estimating a manufacturing yield of the semiconductor device by simulating the semiconductor device at one or more of the output metric corners.

9. The method of claim 1, further comprising:
    identifying, using the computer-implemented circuit analyzer, at least one device sensitivity for which a non-functional yield of the semiconductor device with respect to at least one of the plurality of metrics is estimated to exceed the respective output metric corner for the at least one of the plurality of metrics.

10. The method of claim 9, further comprising, in response to identifying the at least one device sensitivity:
    iterating design of a portion of the semiconductor device in response to identifying the at least one device sensitivity and re-analyzing the semiconductor device using the computer-implemented circuit analyzer until a predetermined functional yield with respect to the at least one of the plurality of metrics is satisfied.

11. The method of claim 1, further comprising:
    generating a surrogate simulation model according to the output distributions; and
    simulating behavior of the semiconductor device using the surrogate simulation model.

12. The method of claim 11, wherein the simulating is performed using a set of candidate corners for the plurality of metrics that are generated by a Response Surface Model and meet specification criteria determined according to the output metric corners.

13. The method of claim 11, wherein the simulating is performed using a larger input data set than that used in determining the metric distribution corresponding to each of the plurality of metrics for the semiconductor device.

14. A system comprising:
    a processor; and a non-transitory storage medium having processor-readable instructions stored thereon, which, when executed, cause the processor to perform steps comprising:

determining a metric distribution corresponding to each of a plurality of metrics for the semiconductor device;

transforming the metric distributions into respective input distributions having a common distribution type;

calculating a correlation value for each input distribution;

calculating a joint probability distribution as a function of the input distributions and their respective correlation values, such that the joint probability distribution has a joint probability corner at a target sigma level;

calculating, for each input distribution, an output distribution manifesting an output metric corner scaled as a function of the joint probability distribution and the respective correlation value of the input distribution.

15. The system of claim 14, wherein the target sigma level indicates a joint probability of non-functional yield for the semiconductor device.

16. The system of claim 14, wherein calculating the joint probability distribution comprises deriving a multivariate probability ellipse that equates to the target sigma level.

17. The system of claim 14, wherein calculating the joint probability distribution comprises:

identifying a first location corresponding to an intersection between first corresponding corners of the input distributions;

identifying a second location corresponding to an intersection between second corresponding corners of the input distributions;

fitting a semi-major radius of a multivariate probability ellipse to the first location and the second location;

calculating a semi-minor radius of the multivariate probability ellipse as a function of the respective correlation values of the input distributions; and calculating the target sigma level as the hypervolume of the multivariate probability ellipse.

18. The system of claim 14, wherein transforming the metric distributions into respective input distributions having a common distribution type comprises:

characterizing each metric distribution as a non-negative Weibull distribution; and transforming each metric distribution from its respective non-negative Weibull distribution to a normal distribution as the common distribution type, wherein the joint distribution is a multivariate normal distribution.

19. The system of claim 14, wherein the processor-readable instructions, when executed, cause the processor to perform steps further comprising:

analyzing the semiconductor device according to the output metric corners of the output distributions.

20. The system of claim 14, wherein the processor-readable instructions, when executed, cause the processor to perform steps further comprising:

generating a surrogate simulation model according to the output distributions; and simulating behavior of the semiconductor device using the surrogate simulation model.

* * * * *

UNITED STATES PATENT AND TRADEMARK OFFICE
CERTIFICATE OF CORRECTION

PATENT NO.         : 8,819,605 B1                                         Page 1 of 1
APPLICATION NO.    : 13/786927
DATED              : August 26, 2014
INVENTOR(S)        : Barker It is certified that error appears in the above-identified patent and that said Letters Patent is hereby corrected as shown below:

In the Specification

In column 6, line 22, delete "system." and insert -- system, --, therefor.

In column 7, line 19, delete "system_sigma=sqrt[(3*sqrt(2)/2)+(3*sqrt(2)/2)$^2$]" and insert -- *system_sigma = sqrt[(3 * sqrt(2)/2)$^2$ + (3 * sqrt(2)/2)$^2$]* --, therefor.

Signed and Sealed this
Tenth Day of March, 2015

Michelle K. Lee
*Deputy Director of the United States Patent and Trademark Office*